March 29, 1938.  R. BERNER  2,112,326

PORTABLE ASPHALT MIXING PLANT

Filed April 30, 1936  3 Sheets-Sheet 1

Inventor
ROBERT BERNER.
By Robert Cobb
Attorneys

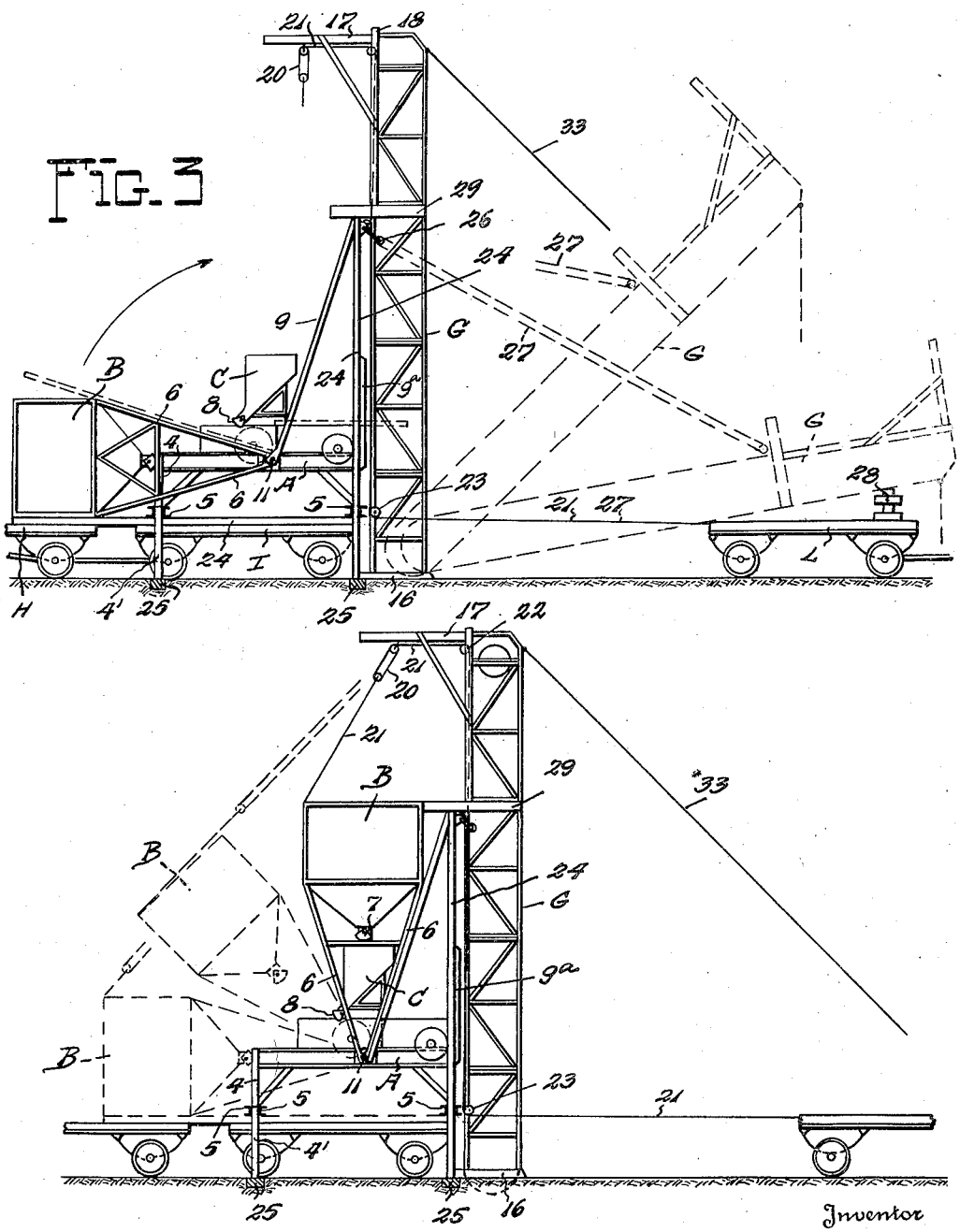

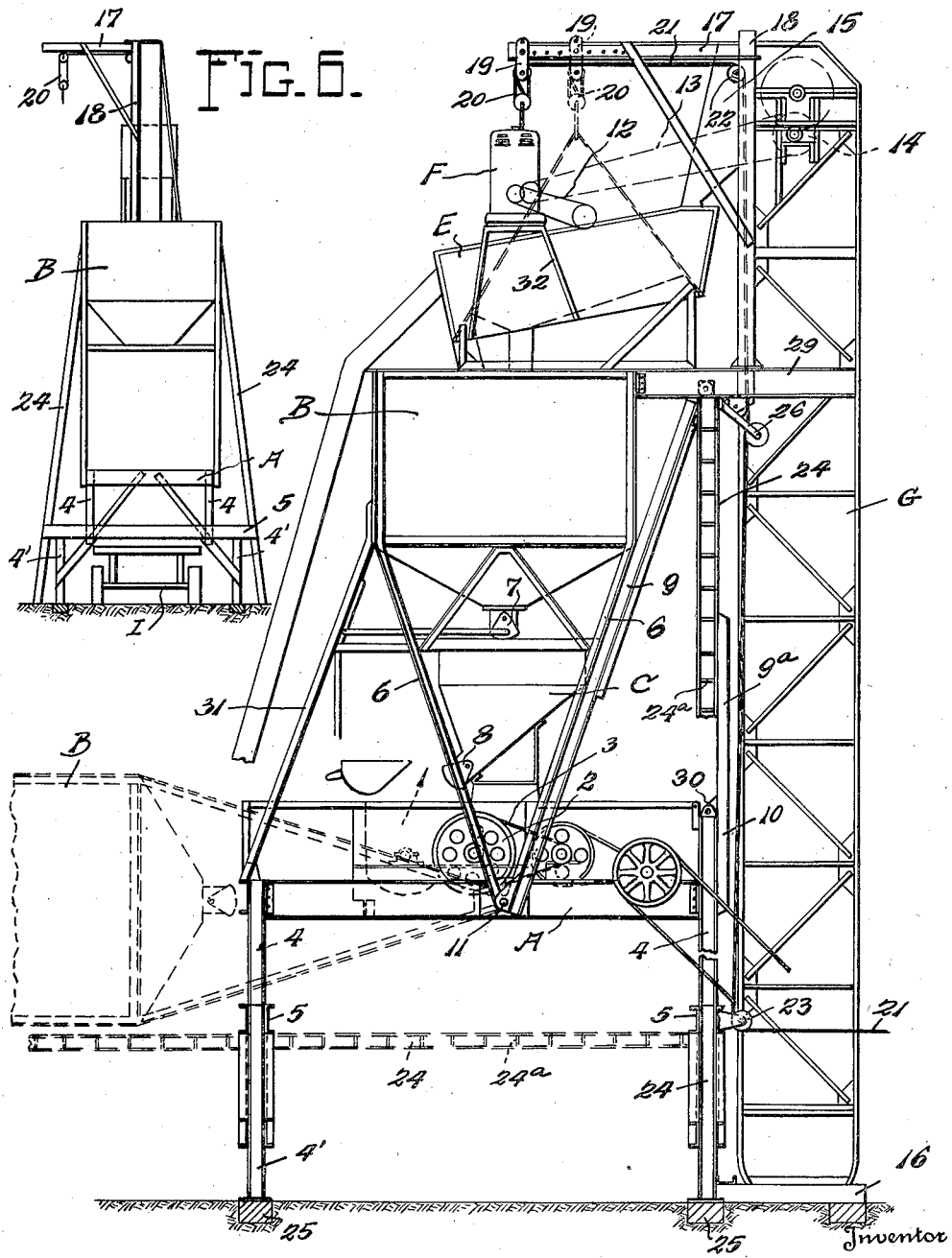

Patented Mar. 29, 1938

2,112,326

UNITED STATES PATENT OFFICE 2,112,326

PORTABLE ASPHALT MIXING PLANT

Robert Berner, Indianapolis, Ind., assignor to Hetherington & Berner Inc., Indianapolis, Ind., a corporation Application April 30, 1936, Serial No. 77,281

14 Claims. (Cl. 94—41)

This invention appertains to the art of mixing plants, and involves primarily improvements in such plants of the portable type, being primarily designed for the mixing of asphalt and other aggregates useful for the pavement of roads or the like. More recently it has become highly desirable in this particular field of mixing plants to provide a design of plant which is easily transportable from one place to another, which may be quickly set up for use and knocked down when it is desired to move the same to a new site of use, and which can be set up or knocked down without the necessity of employing a special machine such as a crane, or special rigging such as a gin pole, for such operations.

The transportable mixing plant of this invention fulfills the foregoing objectives, and, in addition thereto, it is so designed that it may be very easily shipped or transported by railway flat cars or by ordinary trucks and trailers at present in use.

In the carrying out of this invention, the mixing plant is built up of a number of units, the final assembly of which constitutes the complete working plant. The said units may be characterized as including a base unit or section, a special A-frame bracing and hoisting unit, a vertical conveyor unit or elevator by which the aggregates to be mixed, or certain of them, are elevated preparatory to being screened and supplied to the measuring hopper and mixing instrumentalities, a screen unit, a supply bin unit, and detail parts and connections which do not in themselves form very essential features of the invention but are employed to connect up the various unit structures referred to.

In the carrying out of this invention, furthermore, the sections or units above referred to are specially designed so that they may be transported with facility by the flat cars or truck and trailer vehicles previously referred to, and very easily set up and removed in respect to the carrying vehicle, so that suitable hoisting tackle or operating cable or ropes may be operated to place the sections or units in proper relative positions. Generally speaking, when the sections of the plant have been conveyed to the site of use thereof, as for instance by being transported on truck and trailer vehicles, the base frame is set up while the supply bin unit is still supported by the vehicle, the hoisting and bracing A-frame is then caused to be moved to its operating position, and by the use of said frame the elevator unit which is brought alongside by means of one of the truck and trailer vehicles is moved to its vertical operating position alongside the base section. When the elevator has been properly set up by the cable actuating means working on the said A-frame unit, a jib or boom with suitable tackle at the upper end of the elevator is then availed of for the shifting or raising of the supply bin unit, but it may be swung to another position for facilitating the raising of the relatively large screen unit to a point near the upper portion of the elevator, after which the said screen unit may be swung by revolving said jib or boom to bring the unit into position above the supply bin unit where the screen unit is necessarily employed.

By the operating rope or cable provisions of the invention, the truck used for transporting the transportable mixing plant may be used to actuate the said cable or rope provisions for performing the elevating functions incident to the assemblage of the various sections or units of the plant in their proper operating positions. Likewise, the said vehicle means may be employed for the lowering of the various units as the plant is disassembled or knocked down for transportation to a new site of use.

Or, there may be used for the purposes of the invention, a special engine or motor unit equipped with a driving means for a cable, such as a more or less powerful winch, whereby to effect the actuation of the cable actuating means resorted to for the proper raising of the various said units or sections and lowering same in the setting up and knocking down operations of the plant.

A preferred embodiment of the invention is illustrated in the accompanying drawings, but it is not wished to be limited to the exact details thereof, since such details are not entirely essential and may be modified in accordance with the spirit and scope of the invention, and the scope of the appended claims.

In the annexed drawings:

Figure 4 is a view similar to Figure 3, but illustrating the method of raising the supply bin unit to its proper position above the mixer platform.

Figure 5 shows the plant in a further state of completion of the erection thereof, dotted lines illustrating how the jib boom is used to raise the screen unit, and full lines illustrating said screen unit in its proper position above the supply bin and ready to receive aggregate materials from the vertical conveyor or elevator previously erected.

Figure 6 is a view showing primarily the construction of Figure 5, but looking at the plant from a direction at right angles to the illustration of Figure 5, certain parts being omitted.

Figure 7 is an enlarged view bringing out more clearly certain of the detail features of the construction of the plant when completely erected, which features are more or less diagrammatically depicted in the previous views of the drawings.

Figure 1:
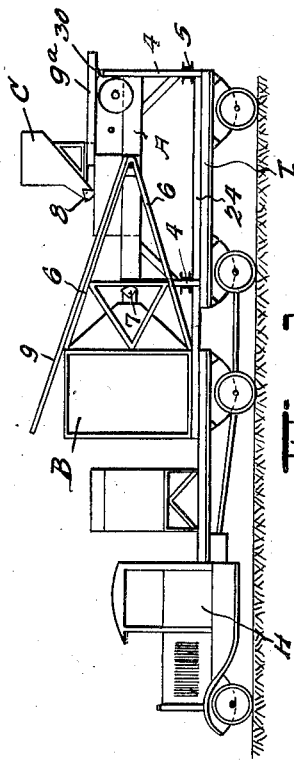
Figure 1 is a view showing a tractor and trailer vehicle loaded with certain sections or units of the asphalt plant of the invention, in knock down condition, as in the condition for transportation to the site of use.
Figure 2:
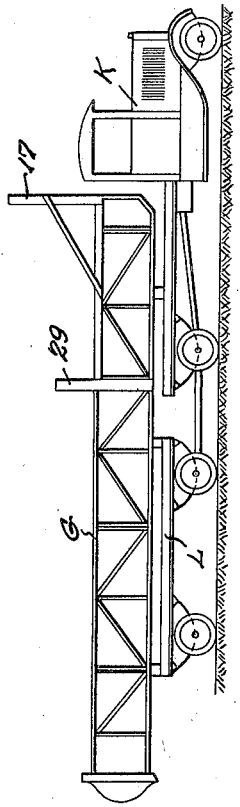
Figure 2 is a similar view in side elevation, showing the elevator or vertical conveyor as when being transported.

For an understanding of the construction of the portable asphalt mixing plant of this invention, Figure 7 will first be referred to, the same showing the completely assembled plant substantially ready for use. The plant comprises a mixer platform unit A, on which is carried the mixer 1, which may be of conventional type and which is driven by any suitable power mechanism as by means of a drive pulley 2 and driving belt 3 operated from a suitable motor carried by the sub-structure of the plant. The platform A is carried upon column members 4 and 4' which are virtually vertical channels, the same being connected horizontally by means of cross-beams 5 consisting preferably of ordinary channels to afford necessary strength.

Above the platform structure or unit A and the mixer 1 and directly associated parts, is located the supply bin unit comprising the bin B and the supporting frame for these parts which is somewhat V-shaped, said frame designated 6. Aggregate materials are supplied to the bin structure B and fed therefrom under the control of valve means 7 to a measuring hopper C, which in turn is equipped with valve means 8 for controlling the passage of measured aggregates from the hopper C to the mixer 1. The hopper C is carried on the platform A. The bin and hopper unit comprising the parts B, C, and 6 primarily, is supported, when the plant is set up, by cooperation of an A-frame comprising the inclined members 9 and the vertical members 10, the members 9 being pivoted at their lower ends, as shown at 11, to the opposite sides or members of the mixer platform A, for a purpose to be hereinafter set forth.

Above the combined supply bin and measuring hopper unit just described is located the vibratory screen unit E which is a unit separable from the other structural units herein described, in order that it may be handled as a separate unit in the assembling or knocking down of the portable plant. If desired, a motor F may be disposed adjacent to the screen unit E with suitable driving connections leading therefrom to the unit, including a drive 12, and other driving connections including a drive belt 13, leading to a drive pulley 14 at the upper end of the elevator unit which is generally designated at G.

Figure 3:
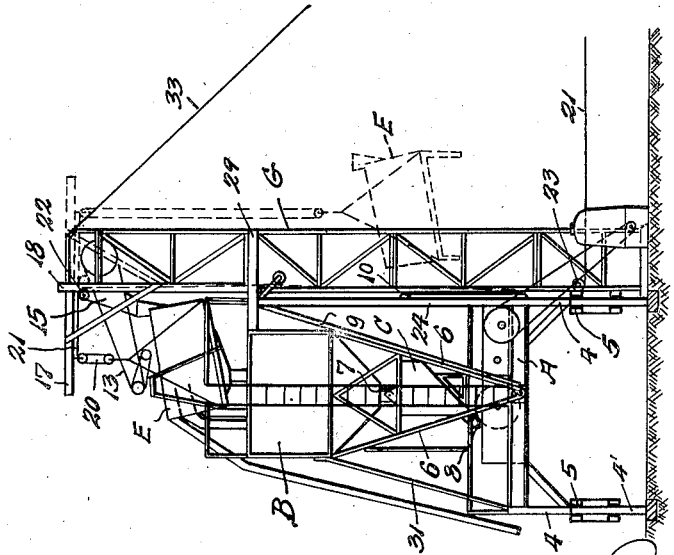
Figure 3 is a side elevation showing the two trailer drawn vehicles carrying the units illustrated in Figures 1 and 2 backed up to the site where the plant is to be erected, and further showing the method of erection by the self-contained jib or boom features, tackle or hoisting cables.

The elevator G is of conventional type, comprising largely an endless conveyor having suitable buckets for elevating the aggregate materials which are to be fed from the elevator by a closed chute 15, into the screen unit E. The lower end of the elevator G will preferably be rounded and seated in a suitable base 16 as seen in Figure 7. At the upper end thereof the elevator G carries a hoisting device comprising a swinging jib or boom 17, the axis of the swinging movement of which is located at 18 so that the said jib 17 may be shifted from a position as illustrated in Figure 7, in which it is above the screen unit, to a position such as shown in Figure 5 in dotted lines, wherein the jib extends over, or partially over, the upper end of the elevator G and provides a jib or boom member with hoisting tackle for the raising of certain units of the complete apparatus. Or, the jib 17 may be swung substantially 90° so as to extend at right angles to its position of Figure 7, for the elevation of the screen unit E or other parts as desired. It will be apparent that the jib 17 carries by means of an adjustable hanger 19, a suitable tackle block 20 and hoist cable means 21, the latter passing from the block 20 over a guide sheave 22 downwardly and longitudinally of the elevator G to a second guide sheave 23, from which the cable may pass horizontally to a point of connection with any suitable actuating means. As shown in Figures 3 and 4, the actuating means availed of may be the vehicle by which the plant is hauled to or from the location where it is to be erected, but instead of connecting the cable 23 with such vehicle, should there be available a power winch or any similar driving mechanism, the cable could be attached to the latter for operation thereby after a manner well known in the art.

The hauling means for conveying the portable plant of this invention to the site may be briefly referred to in conjunction with Figures 1 to 4 of the drawings. For long shipments, of course, the plant of the invention may be assembled in accordance with the manner of distribution of the units illustrated in Figures 1 and 2, upon flat cars, rendering the plant easily transportable in this way for long hauls, because the approximate width of the units is equal to or less than the width of a flat car. If the place of erection of the plant is not adjacent to a railroad or trackage, the plant will be loaded upon the tractor-trailer vehicles shown in Figures 1 to 4, in whole or part, and this may be done either after shipment upon the flat cars or for direct shipment from the factory where the plant is fabricated.

In Figures 1 to 4 the tractor-trailer vehicles are shown to be of substantially conventional type, including the tractor or truck H and the four-wheel trailer I used for the hauling of the mixer platform unit, the supply bin unit and the associated parts that are shown in Figure 1. A separate tractor-trailer vehicle combination, depicted as the truck K and the four-wheel trailer L in Figures 2, may be employed for transporting the elevator which comprises a relatively long and narrow frame structure, as readily seen upon reference to the drawings.

The setting up of the plant as described generally in relation to Figure 7 will now be set forth, referring first to Figure 3 which shows the tractor-trailer combination vehicle means located, with the parts illustrated in Figure 1 thereon, and steps of partial completion of erection of the plant. This Figure 3 also shows the elevator as having been brought to the site of erection by its tractor-trailer vehicle means, and the process of erection of said elevator. When the vehicle means supporting the supply bin and mixer platform units is at the site of erection of the plant, as shown in Figure 3, the said parts will be largely supported upon so-called skid beams 24 which are long metal beams that span the space between the tractor and trailer vehicles H and I and are to be used as a part of the general frame structure of the plant when completed. It is first necessary to raise the units A, B, and C of the plant slightly, as by means of jacks and chock blocks, until the weight of the said units is taken off the vehicle means H—I previously supporting them by the channels 5 before described and the skid members 24. This done, the vertical or column members 4' are placed in position and secured to the parts 5 so that the mixer frame and supported parts are thereupon carried by said members 4', which may be stepped in suitable concrete or other footings 25, see Figure 3. Since now the weight of the bin and mixer platform unit features and directly connected parts is carried by the members 4 and 4', and the channels or cross-beams 5 are supported a slight distance above the bed of the vehicle means, the weight of said units is removed from the skid members 24 and the load thereof is carried by the column members 4' which are shipped loose with the other units that are carried by the vehicle means.

The next step in the erection procedure is to raise the A-frame unit comprising the inclined members 9 and vertical members 9a, these parts being then bolted or otherwise fastened to render the A-frame substantially rigid on the mixer platform unit A. The A-frame parts 9 and 9a may be additionally braced and reinforced by now shifting the skid members 24 to vertical positions, in which their lower ends are supported upon the grade carrying the plant and their upper ends are attached to opposite sides of the A-frame at the top thereof. The A-frame carries at its upper end a suitable tackle block 26 which may receive a hoisting cable suitably trained about the pulleys thereof.

The elevator G having been positioned in the lower dotted line disposition seen in Figure 3, the tackle means 26 including the cable 27 will be connected with the elevator G some distance from the top portion thereof, and the vehicle means K—L may be now caused to travel under power, with said cable means 27 connected therewith, and in this way the elevator will be hoisted by means of the hoisting connection leading to the A-frame members 9, 10 and 24. In order to incline the elevator to the positions in lower dotted lines in Figure 3, the outer end, or the end remote from the platform A, may be backed up slightly by means of the back means shown diagrammatically at 28. In Figure 3, with the A-frame set up and the associated sub-units carried by the columns 4' along with the A-frame, the method of raising the elevator G to its working position affords a means of facilitating this operation in a self-evident manner, and Figure 3 shows how the raising of the elevator G is readily accomplished so that its lower end will be supported in the footing 16 when the raising operation has been completed.

The next step to complete the setting up of the apparatus hereof is to connect the tackle means of the tackle block 20 carried by the jib 17, to the supply bin unit B, which, as previously stated, is pivotally mounted at 11, by means of its frame members 6, upon the platform A. When this connection has been effected, the hoist cable 21 may be operated, as shown in Figure 4, by suitable power, to move the bin unit B to a vertical position for use, same being the full line position of Figure 4 as distinguished from the dotted line positions that illustrate the process of raising same.

With the bin structure B properly raised, it will be secured rigidly in its upraised position by means of the horizontal connecting and brace members 29, see Figures 6, 3 and 4. The skid members 24, previous to the elevation of the bin unit B, have been released and set up in slanting positions, see Figure 6, with their upper ends connected with the upper end of the A-frame 9—9a, thereby bracing said frame and rendering the whole super-structure of the plant rigid. The skid members 24, or one of them, will be equipped with ladder rungs 24a to facilitate climbing up the super-structure of the plant by workmen or operators thereof. The manner in which the members 9a of the A-frame 9—9a are pivoted to the structural parts of the plant near the platform A is shown best in Figure 7, the point of pivotal connection being indicated at 30.

From the foregoing it will be seen that the bin and elevator units are now disposed in their proper positions as shown in Figure 4. Of course, suitable braces and truss rods will be placed in position when the parts are thus properly assembled for use, but since these details are not essential or material to the invention, they are not described completely. For instance, in Figure 7 it will be seen that brace members 31 are used to connect the end of platform A remote from the elevator G to the bin in order to substantially support the latter, and at other different places in the plant assembly such brace members or guy rods or bars may be availed of to a greater or less extent.

The elevation into proper position of the screen unit E is the next step to be performed in completely assembling the plant, and for this purpose the tackle block 20 and hoist cable 21 are resorted to. The jib 17 is turned upon its position of Figure 7 and Figures 3 and 4, so that the tackle means of the tackle block 20 may be connected suitably to the screen unit E, which is on the ground and has been brought to the site by the vehicle means previously described. Then the cable 21 is operated and the screen unit E, which is a relatively heavy structure, is hoisted in suspension upon the jib 17 until it has been raised to a point opposite the space above the unit B, whereupon the jib 17 will be moved pivotally to carry the unit E to its proper working position above the bin B. By suitable braces and truss members, the unit E will be mounted in place above the frame structure of the bin and will be thereafter ready for use for screening the aggregate materials that are fed thereto by the chute 15 from the elevator G. If the motor F is employed, it will be elevated by use of the tackle means 19, 20, and 21, in a self-evident manner, until the motor is positioned on the supporting frame 32, or it will be secured by bolts or other fastening means. The hanger 19 for the tackle block 20 is adjustable to facilitate the hoisting operations for the screen unit E, and the motor unit F, and other parts that may have to be raised, such as structural members that form braces or trusses for the various main units of the plant as above described.

Asphalt mixing plants of the type of this invention involve the employment of a drier, which usually comprises an extremely long drum in which the aggregates are dried preliminary to the proportioning and mixing thereof. The drier feature of the plant assembly is not illustrated, but the drier unit would be brought to the site of the plant by means of tractor-trailer vehicle transportation, after the manner of the handling of the units that are described above and shown in the accompanying drawings.

By the means of the invention as set forth, it will be apparent that the various units, most of which are extremely heavy, can be handled in an expeditious manner, and, so far as the method of assembling or hoisting the various units into place is concerned, the plant has self-contained hoisting instrumentalities for such purpose. As seen in Figures 3, 4, and 5, when the elevator G has been placed in operative position and secured by bracing and other connections, a guy wire 33 may be employed to connect with the upper end of the elevator and may be anchored some distance from the plant by ground anchors or the like. The guy wire 33 may be placed in position before the use of the jib 17, and associated tackle means, for the purpose of the elevation of the bin unit.

It will of course be understood that in disassembling or knocking down the plant hereof, the reverse of the operations which have been described in indicating the method of raising and assembling the units, may be resorted to, and the self-contained hoisting tackle and jib appliances will be equally effective to accomplish the desired result.

Having thus described my invention, what I claim as new and desire to secure by Letters Patent of the United States, is—

1. In a mixing plant of the class described, in combination, a base structure comprising a mixer unit, a foldable A-frame thereon shiftable from a knock-down position to a vertical position, a supply bin unit on the mixer unit and connected thereto to move from a knock-down position to a vertical position relatively to the mixer unit, an elevator unit comprising a jib and hoisting means, and hoisting instrumentalities for connection with and raising of the elevator unit from an inoperative prone position to operative upright position, the same supported by the A-frame, together with means to connect the jib and its hoisting means with the supply bin unit when the elevator unit is in said upright position for raising the bin unit from a knock-down position to an erect vertical position, said elevator and bin units cooperating with the A-frame when in upright positions to form a stabilized superstructure.

2. In a mixing plant of the class described, in combination, a base structure comprising a mixer unit, a foldable A-frame thereon shiftable from a knock-down position to a vertical position, a supply bin unit swingably connected to the mixer unit and connected thereto at one side of the A-frame to move from a knock-down position to a vertical position against the A-frame, an elevator unit movable against the A-frame opposite to the bin, said bin and elevator being sustained by said frame, said elevator unit including a jib and hoisting means, hoisting instrumentalities for connection with and raising of the elevator unit from an inoperative prone position to operative upright position, the same supported by the A-frame, and a separable screen unit adapted to be positioned above the supply bin unit, the hoisting means of the said jib and hoisting means carried by the elevator being connectible with the screen unit to hoist the same to a position above the supply bin unit.

3. In a mixing plant of the class described, in combination, a base structure comprising a mixer unit, a foldable A-frame thereon shiftable from a knock-down position to a vertical position, a supply bin unit on the mixer unit and connected thereto to move from a knock-down position to a vertical position relatively to the mixer unit, an elevator unit comprising a jib and hoisting means disposed over the A-frame, and hoisting instrumentalities for connection with and raising of the elevator unit, the same supported by the A-frame, together with means to connect the jib and its hoisting means with the supply bin unit for raising the latter from a knock-down position to an erect vertical position, the jib of the jib and hoisting means being adapted to swing in a horizontal plant and being carried near the upper end of the elevator.

4. In a collapsible or knock-down type of aggregates mixing plant, in combination, a base structure comprising a platform, column members for carrying said platform detachable therefrom, a foldable A-frame on said platform, a movably mounted knock-down bin unit connected with the platform at the base of the A-frame, an elevator adapted to be assembled and disassembled in relation to the above parts, said elevator being constructed and arranged to swing about its base into coacting relation to the A-frame, hoisting means intermediate the A-frame and the elevator whereby to raise the elevator to a position adjacent the A-frame, hoisting means carried by the elevator and adapted to be operably connected to the bin unit for raising the bin unit to a position adjacent the A-frame, and means for fixedly connecting the said elevator and bin units together to provide a rigid superstructure including said parts and the A-frame and platform.

5. In a collapsible or knock-down type of aggregates mixing plant, in combination, a base structure comprising a platform, column members for carrying said platform detachable therefrom, a collapsible A-frame on said platform, a movably mounted knock-down bin unit connected with the platform, an elevator adapted to be assembled and disassembled as a unit in relation to the above parts, hoisting means intermediate the A-frame and the elevator whereby to raise the elevator to a position adjacent the A-frame, hoisting means carried by the elevator and adapted to be operably connected to the bin unit for raising the bin unit to a position adjacent the A-frame, and means for connecting the said elevator and bin units together with the A-frame therebetween sustaining the same to provide a rigid superstructure including said parts and the A-frame and platform, the hoisting means on said elevator including a jib adjacent the top of the elevator and shiftable in a horizontal plane, together with hoisting means on said jib for cooperation with other disassembled parts of the plant for hoisting the same to a position or positions in proper operative relation to the other parts of the plant as above set forth.

6. In a portable type of knock-down mixing plant of the class described, in combination, a base structure, a collapsible A-frame structure carried thereon, a knock-down supply bin unit movably mounted on said base structure and shiftable in one direction therefrom so as to lie in a position, when collapsed, at one side on the base structure, a connectible elevator unit adapted to be secured to the base and A-frame structures at the side of the base structure opposite that at which the supply bin unit is disposed when in knock-down condition, whereby in the hoisting of the elevator unit the latter is counterbalanced by the weight of the supply bin structure at the opposite side of the base structure, and hoisting means carried by the A-frame structure connectible with the elevator for raising the same as set forth.

7. A mixing plant substantially as claimed in claim 4, combined with skid members upon which the platform structure and supply bin unit are supported for transportation, said skid members being combinable with the assembly of units aforesaid, and connecting means between said skid members and the A-frame structure whereby the latter is reinforced or braced when the plant units are set up in assembled condition.

8. A mixing plant substantially as claimed in claim 1, combined with skid members upon which the base structure and the supply bin unit and A-frame members thereon are adapted to be supported for transportation, together with connecting means whereby said skid members may be set up into vertical positions alongside the base structure and A-frame, and the supply bin and elevator units, to reinforce the assembled arrangement of the latter.

9. In a portable and knock-down type of mixing plant, in combination, a base structure including a swingable upright support, a supply bin unit movably mounted to shift to and from a prone position on the base structure, an elevator adjacent to the base structure and movable as a unit in a vertical plane in relation thereto, and self-contained hoisting instrumentalities for raising and lowering the supply bin unit and the elevator in operations of setting up and knocking down the plant, together with means for rigidly securing the elevator, base structure, upright support, and supply bin unit together when set up.

10. A mixing plant as set forth in claim 9 wherein the upright support is an A-frame and carries certain of the hoisting instrumentalities to cooperate with the elevator, other of the hoisting instrumentalities being carried by the elevator to cooperate with the supply bin unit, means for holding the said frame structure in operative set up condition adapted to permit the lowering of the same to collapsed condition, pivotal connecting means between the supply bin unit and the base structure, and pivotal connecting means between the frame structure and the base structure such that certain parts of the frame structure may lie adjacent to the supply bin unit when both are collapsed or knocked down.

11. In a portable knock-down type of mixing plant, the combination of a base structure, a supporting frame mounted thereon, a supply bin unit movably mounted at one side of the frame and shiftable from knock-down position to upright position against the frame at one side, an elevator unit movably mounted at another side of the frame and shiftable from knock-down to upright position also against the frame, and means for rigidly connecting the said movable units together in their upright positions sustained by the frame.

12. A mixing plant as set forth in claim 11 wherein the supporting frame is foldable and means for holding the parts of the frame together to sustain the frame in erect supporting position.

13. A mixing plant as set forth in claim 11 wherein the supporting frame is composed of spaced pivotal sides foldable into prone position when knocked down and connecting means for holding them in erect supporting position.

14. A mixing plant as set forth in claim 11 wherein the bin unit is connected to the base at the foot of the frame and disposed at the opposite side of the supporting frame from the other unit also connected to the base so as to constitute a counterbalance while the other unit is raised into upright position.

ROBERT BERNER.

CERTIFICATE OF CORRECTION.

Patent No. 2,112,326. March 29, 1938.

ROBERT BERNER.

It is hereby certified that error appears in the printed specification of the above numbered patent requiring correction as follows: Page 4, second column, line 17, claim 3, for the word "plant" read plane; and that the said Letters Patent should be read with this correction therein that the same may conform to the record of the case in the Patent Office.

Signed and sealed this 28th day of June, A. D. 1938.

(Seal)

Henry Van Arsdale,
Acting Commissioner of Patents.